United States Patent
Greene et al.

(10) Patent No.: US 7,259,685 B2
(45) Date of Patent: Aug. 21, 2007

(54) LANDING LIGHT FAULT ANNUNCIATOR

(75) Inventors: Randall A. Greene, Greenwich, CT (US); Paul Levine, Valhalla, NY (US)

(73) Assignee: Safe Flight Corporation, White Plains, NY (US)

( * ) Notice: Subject to any disclaimer, the term of this patent is extended or adjusted under 35 U.S.C. 154(b) by 144 days.

(21) Appl. No.: 11/049,957

(22) Filed: Feb. 4, 2005

(65) Prior Publication Data

US 2006/0187087 A1    Aug. 24, 2006

(51) Int. Cl.
*G08B 21/00* (2006.01)

(52) U.S. Cl. ............... 340/641; 340/642; 340/643; 340/945

(58) Field of Classification Search ........ 340/641–643, 340/945, 981, 983
See application file for complete search history.

(56) References Cited

U.S. PATENT DOCUMENTS

| | | | | |
|---|---|---|---|---|
| 3,671,955 | A | * | 6/1972 | Malekzadeh ............... 340/642 |
| 4,195,802 | A | * | 4/1980 | Gilson et al. ............ 244/17.13 |
| 5,173,685 | A | * | 12/1992 | Nimmo ..................... 340/642 |

\* cited by examiner

*Primary Examiner*—Jeffery Hofsass
*Assistant Examiner*—Hongmin Fan
(74) *Attorney, Agent, or Firm*—Lowe Hauptman & Berner, LLP

(57) ABSTRACT

A helicopter of the type having an electrical system, a landing light, a master switch and a power supply of between about 18-32 V for operating the electrical system when the master switch is in an on position also includes a landing light fault detector. The landing light fault detector includes a light switch for turning the landing lights on and off and circuit means for detecting a fault in the landing light and for providing a signal indicative of a fault whether or not the light switch is in an on or off position.

5 Claims, 3 Drawing Sheets

LANDING LIGHT FAULT ANNUNCIATOR

FIELD OF THE INVENTION

This invention relates to a landing light fault indicator and more particularly to a helicopter landing light fault indicator that warns a pilot of a fault in the landing light, whether or not the light is turned on or off.

BACKGROUND FOR THE INVENTION

Fixed wing aircraft typically land at airports with a reasonable level of lighting. Nevertheless, it is desirable to maintain their landing lights in an operable condition. Unlike fixed-wing aircraft, helicopters are frequently called on to land in remote areas, at night and under conditions of inadequate lighting or poor visibility. It is vitally important to land on a relatively flat surface and to avoid obstructions such as trees, wires or the like that might be struck by a rotary blade. It is also important for a pilot to judge the distance to the ground and to set the aircraft down gently to avoid damage to the aircraft and/or himself or any passengers. For these reasons, adequate lighting is essential.

Accordingly, it is presently believed that there may be a relatively large commercial market for a landing light fault detector or annunciator for fixed wing and rotary wing aircraft in accordance with the present invention. There should be a demand, because such annunciators warn a pilot whenever there is a fault in a landing light, which could make it extremely difficult to land in areas of limited visibility.

Further, the landing light fault annunciator in accordance with the present invention indicates a fault whether or not the landing light switch is in an on-position. In effect, a warning is given at any time that the battery switch is on. A still further feature of the present invention resides in allowing the landing light switch to complete a circuit to ground even though the landing light or lights are typically illuminated by about 18 to 32 volts. This feature reduces the likelihood of overheating in the wires that pass through the collective control arm to a switch which is located at the far end thereof if a ground fault occurs in the wire.

A still further advantage of the annunciator in accordance with the present invention resides in a flasher circuit that can be used to flash the landing light on and off for identification of the helicopter during flight or a landing maneuver. This helps other pilots to visually see and avoid the helicopter in flight and helps air traffic controllers to spot the helicopter when approaching an airport.

BRIEF SUMMARY OF THE INVENTION

In essence, the present invention contemplates an aircraft such as a helicopter and a landing light fault annunciator. The helicopter includes an electrical system, a landing light, and a power supply, preferably between about 18 to 32 volts DC, and means such as a master switch for connecting the electrical system and landing light to the power supply. The system is equally applicable to aircraft that have power supplies of a different voltage, as for example, 12 volts. The landing light is connected to the power supply by a landing light switch which is provided for turning the landing light on or off. The landing light detector or annunciator includes circuit means for detecting a fault in the landing light and for generating a signal indicative of a fault when the helicopter is provided with power from the power supply. An important feature of the fault annunciator resides in that it identifies and indicates a fault whether or not the light switch is turned on or off.

In a preferred embodiment of the invention, a switch for turning the landing light on or off is disposed at one end of the collective control stick and means for controlling the power from the 18 to 32 volts DC by having the switch provide a path to ground is provided. In a further embodiment of the invention, the circuit means also includes a flasher circuit for flashing the landing lights on or off for easy identification of the helicopter in flight or when landing at an airport or the like. The circuit may also include a light or annunciator to indicate that the landing light switch is in the on position.

The invention will now be described in connection with the following figures, wherein like numbers have been used to designate like elements.

DESCRIPTION OF THE PREFERRED EMBODIMENTS OF THE INVENTION

Figure 1:
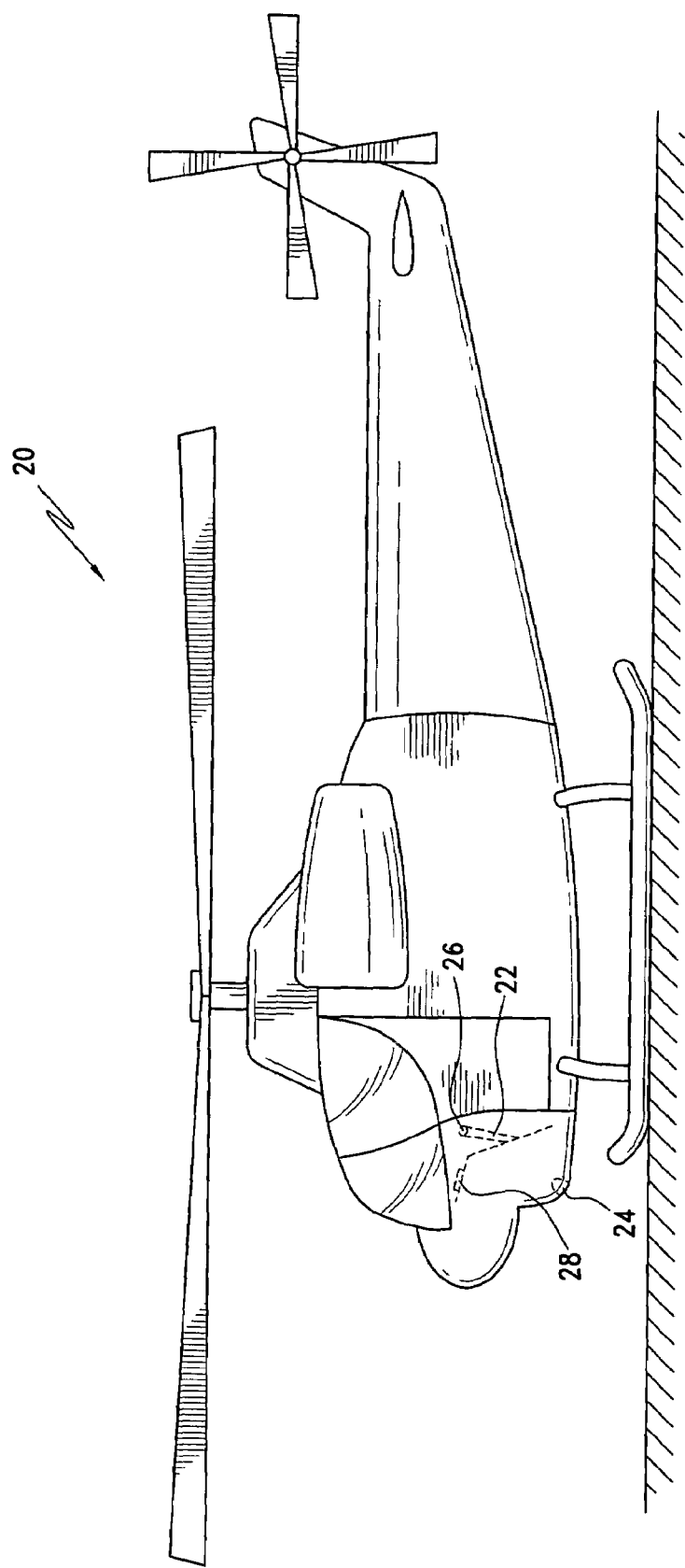
FIG. 1 is a side elevational view of a helicopter in accordance with the present invention.

As shown in FIG. 1, an aircraft such as a helicopter 20 which may be of conventional design includes a control stick 22 (shown schematically) and a landing light 24 which is turned on or off by a light switch 26 at one end of the control stick 22 in a conventional manner. However, the helicopter 20 also includes a landing light fault annunciator 28 in accordance with the present invention.

Figure 2:
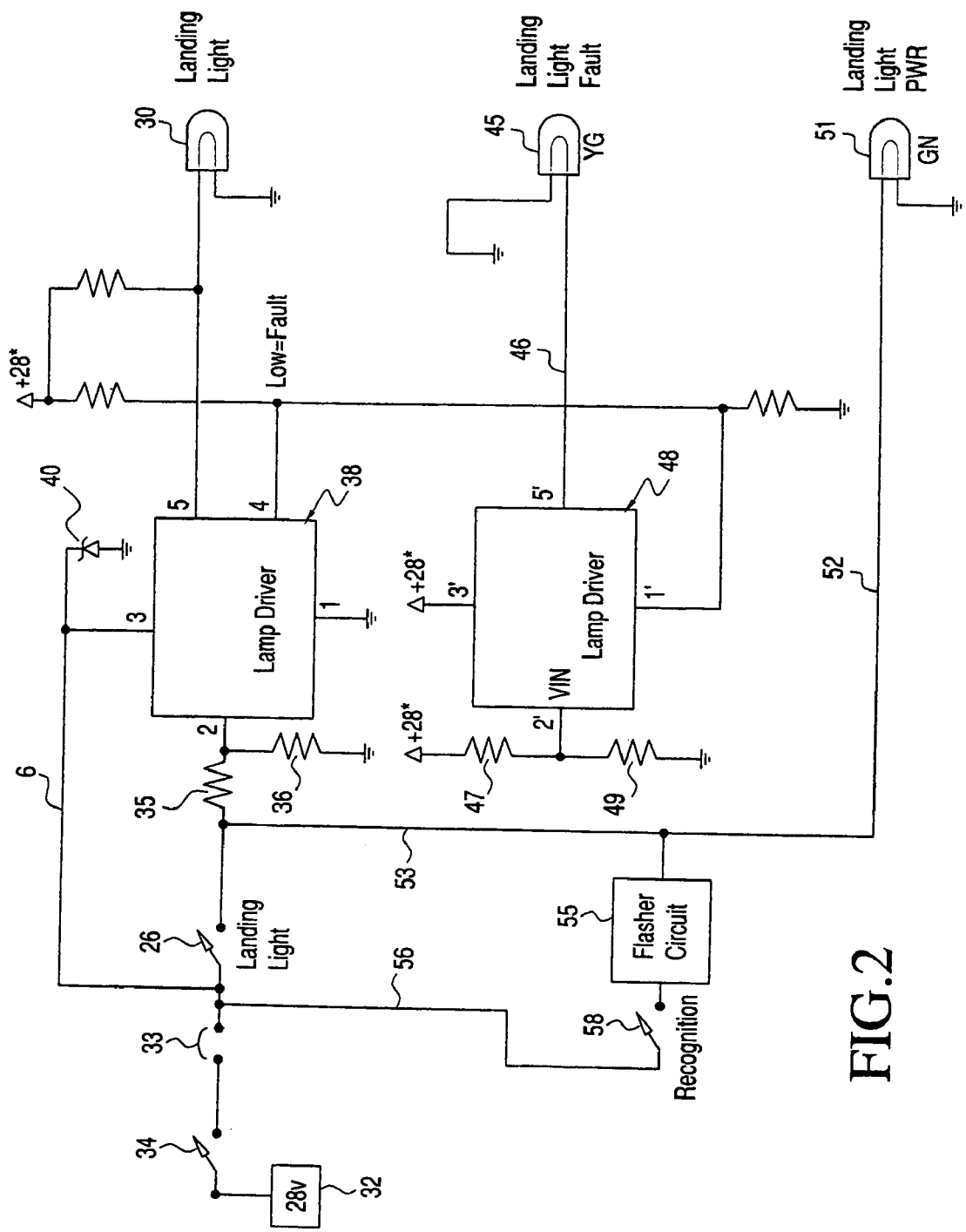
FIG. 2 is a schematic diagram of a landing light fault annunciator in accordance with the present invention.

The landing light fault annunciator 28 will now be described in connection with FIG. 2. As shown therein, one or two landing lights 30 are illuminated by a source 32 of electrical energy. The source 32 of electrical energy provides between 18 to 32 VDC and preferably 28 volts by turning a landing light switch 26 to an on or closed position.

The entire circuit is energized through circuit breaker 33 when a master battery switch 34 is switched to an on-position. As shown, the power from the source 32 is connected to a point 3 by a lead 6 and to a voltage divider including resistor 35 and resistor 36 the latter of which is connected to a ground. As a result, 5 volts is delivered to point 2 and to a smart power switch or lamp driving chip 38, as for example a BTS 426 L1 chip. A preferred embodiment consists of two 426 chips in parallel. Two were used since one of the 426 chips does not have sufficient capacity for the load.

The source 32 is also connected to a 1.5 KE, 36A zener diode 40 for limiting the voltage to the chip 38 to protect the circuitry from inadvertent voltage surges on the 28V supply. When point 2 is 5 volts, then point 3 is connected to point 5 to deliver 28 volts to the landing light 30. The circuitry within chip 38 causes the voltage at point 4 to switch to the low state if there is a fault in the landing light according to table 1.

A landing light fault annunciator 45 is connected to an additional lamp driver chip 48 by a lead 46 which operates in a similar manner to the lamp driver chip 38. For example, the chip 48 is connected to a source of 28 V through a voltage divider made up of resistor 47 and resistor 49 to point 2' to provide 5 volts. When point 1' goes low point 3' will be connected to point 5'. This in turn provides 28 volts to the landing light fault annunciator 45.

In a further embodiment of the invention a landing light power indicator lamp 51 is connected to the source 32 by leads 52 as an indication of whether or not the landing light switch is in an on or off position. A flasher circuit 55 is also connected to the source of power 32 by a lead 56 through a recognition light switch 58 to circuit 53.

The landing light fault detector as disclosed herein provides a signal that annunciates an open lamp. It is designed particularly to monitor and switch a 28 VDC 250 watt landing light (GE 4596) as used in a Bell helicopter. The specifications include an input voltage of 18 to 32 VDC, an output current of 14 amperes, maximum. The landing light output and landing lamp fault output drivers are protected against short circuits to ground and over temperatures of operation.

TABLE 1

Operation:

| LAMP SWITCH POSITION | LANDING LIGHT CONDITION | LANDING LIGHT SWITCH STATUS | LANDING LIGHT FAULT LAMP |
|---|---|---|---|
| OFF | OPEN | OFF | ON |
| OFF | SHORTED | OFF | OFF |
| OFF | OK | OFF | OFF |
| ON | OPEN | ON | ON |
| ON | SHORTED | ON | ON |
| ON | OK | ON | OFF |

Figure 3:
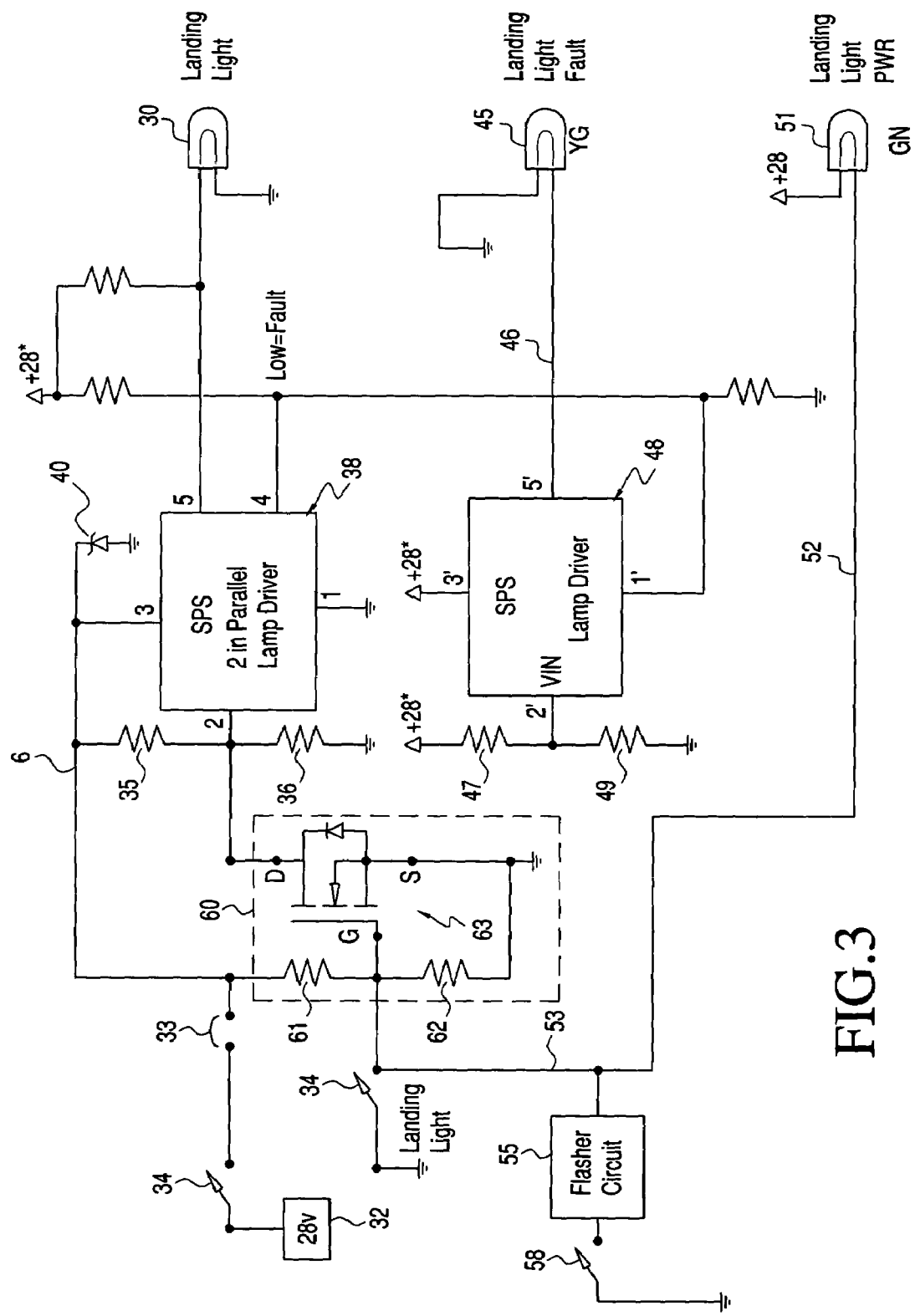
FIG. 3 is a schematic diagram of a landing light fault annunciator in accordance with a second embodiment of the invention.

A second embodiment of the invention is illustrated in FIG. 3 and operates in a similar manner to the first embodiment. However, the second embodiment of the invention includes an inverter circuit 60, which allows the switch 26 to complete a circuit to ground as opposed to a 28 volt source. The inverter circuit includes a 22 K resistor 61 and 4.7 K resistor 62 and a field effect transducer 63. The field effect transducer 63 may for example be a 2N7000 having a source S, drain D and a gate G which operate in a conventional manner as will be well understood by persons of ordinary skill in the art.

While the invention has been described in connection with these preferred embodiments, it should be recognized that changes and modifications may be made therein without departing from the scope of the appended claims.

What is claimed is:

1. In a helicopter of the type having an electrical system, a landing light, a master switch, a landing light switch, and a power supply of between about 18 to 32 volts DC for operating said electrical system and illuminating said landing light when said master switch is in an on position, the improvement comprising: a landing light fault annunciator including a light switch for turning said landing light on and off and circuit means for detecting a fault in said landing light and providing a signal indicative of a fault when said master helicopter battery switch is connected to said power supply, and wherein said means for detecting a fault in said landing light and for providing a signal indicative of a fault in said landing light is operative whether or not said landing light switch is in an on or off position and said circuit means includes a pair of driver chips in parallel to provide sufficient capacity for the load and the driver chips each cause the voltage to shift to a lower state when there is a fault in said landing light.

2. In a helicopter of the type called for in claim 1, the improvement further comprising means for allowing said light switch to complete a circuit to ground to provide power to the landing light.

3. In a helicopter of the type called for in claim 1, the improvement further comprising a collective for control of the helicopter and in which said light switch is disposed at one end of said collective.

4. In a helicopter of the type called for in claim 1, the improvement further comprising a flasher circuit in said circuit means for flashing said landing light on and off.

5. In a helicopter of the type called for in claim 3, the improvement further comprising a landing light power indicator in said circuit means for showing that power is available for illuminating said landing light.

* * * * *